(12) United States Patent
Spaulding et al.

(10) Patent No.: US 7,931,342 B2
(45) Date of Patent: Apr. 26, 2011

(54) ADHESIVE WHEEL WEIGHT DISPENSING APPARATUS

(75) Inventors: James R. Spaulding, Macomb, MI (US); James A. Cole, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 2038 days.

(21) Appl. No.: 10/899,395

(22) Filed: Jul. 26, 2004

(65) Prior Publication Data

US 2006/0016309 A1    Jan. 26, 2006

(51) Int. Cl.
  *B60B 1/00*     (2006.01)
  *G01M 1/16*     (2006.01)
(52) U.S. Cl. ........................... 301/5.21; 73/470
(58) Field of Classification Search ............ 301/5.21; 73/470
  See application file for complete search history.

(56) References Cited

U.S. PATENT DOCUMENTS

| 5,730,827 A * | 3/1998 | Sewell ........................... 156/269 |
| 6,547,338 B2 * | 4/2003 | Gross et al. .................. 301/5.21 |

FOREIGN PATENT DOCUMENTS

| DE | 4431878 A1 | * | 3/1996 |
| JP | 58221140 A | * | 12/1983 |
| WO | WO 00/26630 | * | 5/2000 |
| WO | WO/26630 | * | 5/2000 |

* cited by examiner

*Primary Examiner* — Hezron Williams
*Assistant Examiner* — Nathaniel Kolb

(57) ABSTRACT

An apparatus for dispensing a predetermined amount of adhesive weighted tape includes a controller adapted to receive a request for a desired amount of adhesive weighted tape and an elongated track member adapted to receive a supply of the adhesive weighted tape. A sensor is mounted adjacent a second end of the track member. The sensor in communication with the controller is operable to transmit a signal to the controller corresponding to a measured amount of weighted tape passing thereby. A motive apparatus in communication with the controller is adapted to move the weighted tape from a first end to the second end of the track member in response to the signal from the sensor. A cutting member disposed adjacent the second end of the track member is in communication with the controller and is adapted to cut the weighted tape in response to the signal from the sensor.

19 Claims, 3 Drawing Sheets

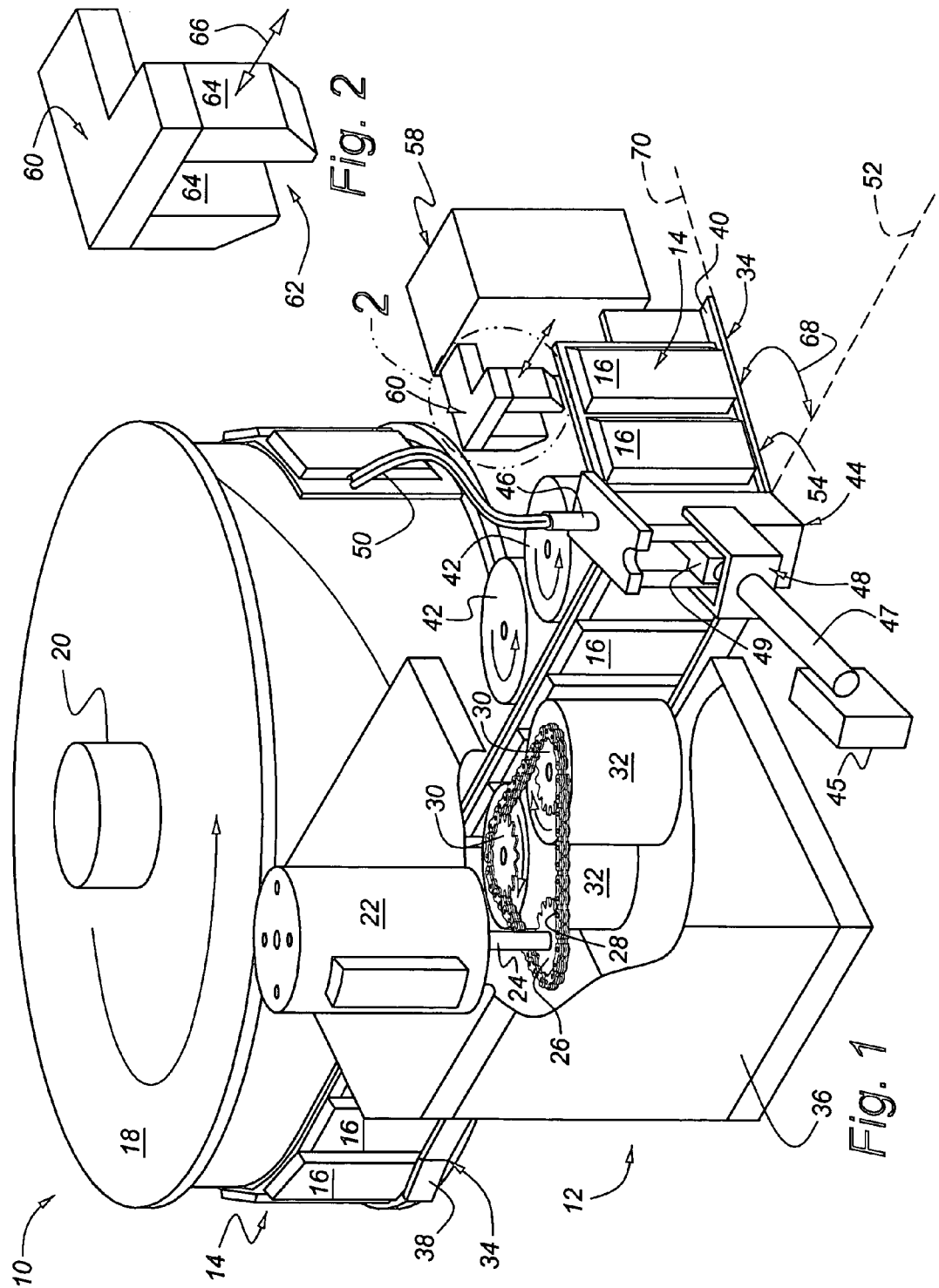

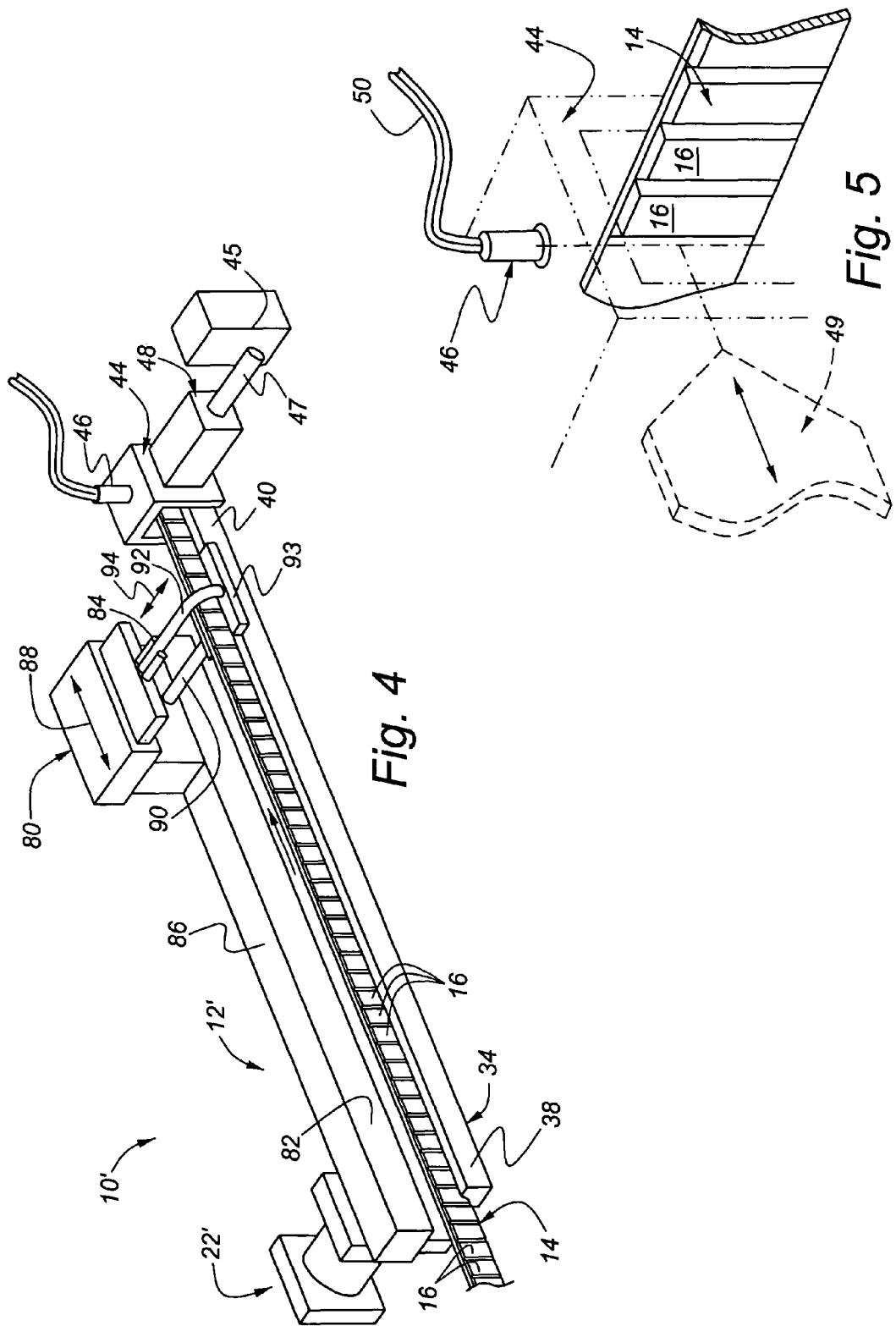

US 7,931,342 B2

ADHESIVE WHEEL WEIGHT DISPENSING APPARATUS

BACKGROUND OF THE INVENTION

The present invention relates generally to automotive wheels and wheel assemblies and, in particular, to an apparatus for dispensing adhesive wheel weights for wheel assemblies.

In automobile assembly plants, wheel assemblies, which typically include a flanged wheel having a tire attached thereto, are balanced prior to installation on the vehicle. The wheel assembly is attached to a balancing machine, which analyzes the wheel assembly and provides an output to an operator indicating an amount equal to a weight necessary to balance the wheel assembly. The operator then selects a corresponding weight from a container adjacent his or her workstation. Typically, the workstation includes a large number of containers with weights ranging from ¼ ounce to nine ounces. For example, there may be as many as 36 individual containers, with the operator required to choose the weight needed from the correct container and also keep track of which of the 36 containers are running low on weights and correctly order more parts to fill these containers. A typical prior art wheel assembly having a flanged wheel includes at least one location for attaching "pound on" wheel weights thereto for balancing the wheel assembly prior to attaching the assembly to the vehicle. These weights are typically constructed of lead alloy. The malleable material properties of the lead alloy allow the weight to conform to the attachment point of the wheel flange.

With the introduction of flangeless wheels, the traditional method of balancing tires with the lead alloy "pound on" wheel weights is impractical because there is no location for attaching the "pound on" wheel weights. As a result, adhesive attachment is an alternative method of attaching weights to wheel assemblies. By providing wheel weights on adhesive tape, the wheel weights easily conform to the radius of the wheel. But again, the workstation needs a large number of individual containers. Moreover, vehicle production may be mixing flanged and flangeless wheels, thus requiring containers for both conventional "pound on: weights as well as adhesive attached wheel weights. Consequently, the space required for wheel weight material on the assembly line is prohibitive. Also, the burden on the operator of choosing the weights from one of the very large number of containers, as well as ordering correct replacement parts, is more than is desirable.

It is desirable, therefore, to provide an apparatus for providing and dispensing wheel weights attached to adhesive tape that does not occupy much space in the assembly line.

SUMMARY OF THE INVENTION

An apparatus for dispensing a predetermined amount of adhesive weighted tape includes a controller adapted to receive a request for a desired amount of adhesive weighted tape and an elongated track member adapted to receive a supply of the adhesive weighted tape. A sensor is mounted adjacent a second end of the track member. The sensor in communication with the controller is operable to transmit a signal to the controller corresponding to a measured amount of weighted tape passing thereby. A motive apparatus in communication with the controller is adapted to move the weighted tape from a first end to the second end of the track member in response to the signal from the sensor. A cutting member disposed adjacent the second end of the track member is in communication with the controller and is adapted to cut the weighted tape in response to the signal from the sensor.

In operation, the adhesive wheel dispensing apparatus is fed a signal from the tire balancing equipment describing the correct mass of weight material required to balance a tire and wheel. The apparatus draws wheel weight material from a spool and, using a sensor such as a photo electric eye, counts the number of weight segments. After the correct number of segments has been advanced from the spool, a cutting edge mounted to a linear actuator, such as an electric or pneumatic powered cylinder, advances to slice through the adhesive tape. The trimmed material then falls into a tray where the operator selects it and applies it to the waiting tire and wheel assembly.

When the weight material is dispensed from a spool, the need to provide as many as 36 containers of pre-packaged wheel weights (in ¼ oz. increments) is eliminated, which saves both line space for the material and the logistics of accounting for 36 container part numbers. Even on a line with mixed flanged and flangeless wheels, the number of containers and line space is significantly reduced. The apparatus in accordance with the present invention is compatible with steel and copper alloy wheel weights. The apparatus is very compact, which saves assembly line space, is capable of communicating directly with the tire balancing equipment, which reduces potential error, and is capable of keeping up with the assembly line speed. The apparatus also will lend itself to the development of the robotic application of wheel weights.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a fragmentary perspective view of a first embodiment of an apparatus for dispensing a predetermined amount of adhesive weighted tape in accordance with the present invention;

FIG. 2 is a fragmentary perspective view in an enlarged scale of the encircled portion 2 in FIG. 1;

FIG. 4 is a fragmentary perspective view of a second embodiment of an apparatus for dispensing a predetermined amount of adhesive weighted tape in accordance with the present invention;

FIG. 5 is a fragmentary perspective end view of the apparatus of FIG. 4; and

DESCRIPTION OF THE PREFERRED EMBODIMENT

Figure 3:
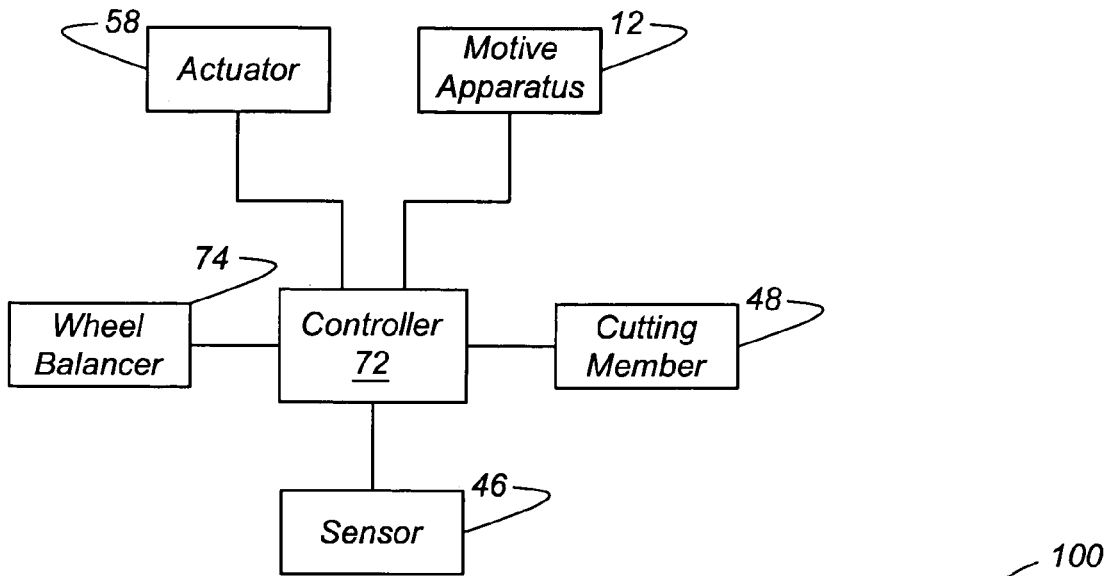
FIG. 3 is a schematic view of the apparatus of FIGS. 1 and 2.

Referring now to FIGS. 1 and 2, an apparatus for dispensing a predetermined amount of weighted tape in accordance with the present invention is indicated generally at 10. The apparatus 10 includes a motive apparatus, indicated generally at 12, in communication with and operable to selectively move a supply of weighted adhesive tape 14. The adhesive tape 14 includes a plurality of weight segments or weights 16 disposed thereon. The weights 16 are preferably formed of a steel alloy or the like. The adhesive tape 14 is preferably double-sided adhesive tape wherein the weights 16 are embedded in the adhesive on one of the sides of the tape 14 and a backing member (not shown) is attached to the other side of the tape 14 to protect the adhesive on the opposite side. Each of the weights 16 preferably has a predetermined and equal weight value, such as two ounces, ¼ ounce or the like. The weights 16 are preferably evenly spaced along the length of the tape 14 and include a gap of a predetermined distance therebetween. The supply of adhesive tape 14 is coiled about and is operable to be dispensed from a spool member 18 that rotates about a central shaft 20. The shaft 20 may be a part of the spool member 18 or may be a distinct member upon which an aperture (not shown) of the spool member 18 is placed for rotation therearound. The term "spool" as used herein can include other forms of storing the weighted adhesive tape 14 prior to use, but is the preferred way to do so.

The motive apparatus 12 includes a motor 22 having a drive shaft 24 extending therefrom. The motor 22 is preferably an electric motor and is connected to an electrical power source (not shown). A gear 26 on a free end of the drive shaft 24 engages with a drive chain, shown partially schematically at 28, that in turn engages with corresponding gears 30 extending from a pair of drive rollers 32. Alternatively, the drive shaft 24 may directly engage with the gears 30 of the drive rollers 32 without the use of a drive chain or employ a similar attachment means, as will be appreciated by those skilled in the art. An elongated track member 34 is disposed adjacent and preferably attached to a housing 36 for the motive apparatus 12 and includes a first end 38 adjacent the spool member 18 and a second end 40. The adhesive tape 14 is operable to move along the track member 34. The track member 34 is preferably formed of, or at least partially coated with, a teflon material, a nylon material, or the other low friction material and has a generally U-shaped cross section for receiving and supporting the adhesive tape 14.

After a free end of the adhesive tape 14 is placed on the track member 34 at or near the first end 38, the drive rollers 32 are operable to engage with the free end of the adhesive tape 14 and move the tape 14 from the first end 36 to the second end 40 of the track member 34. A pair of guide rollers 42 are disposed on a side of the track member 34 opposite from the drive rollers 32. The drive rollers 32 and the guide rollers 42 each contact the adhesive tape 14 on respective engaging surfaces and aid in maintaining the adhesive tape 14 in a vertical orientation within the track member 34 (i.e., the weights 16 are oriented parallel to the engaging surfaces of the rollers 32 and 42).

A guide frame 44 is disposed adjacent the second end 40 of the track member 34. The frame 44 includes a sensor 46 attached at an upper portion thereof and a cutting member 48 disposed on a side surface thereof. The sensor 46 is preferably a photo electric eye, an electronic eye, or other sensing means capable of detecting an amount of dispensed tape 14, the number of weight segments 16, or other indicator relating to the weighted adhesive tape 14. The sensor 46 is also in communication with a controller, discussed in more detail below, such as by an electrical connection through a wire 50. The cutting member 48 is oriented substantially perpendicular to a longitudinal axis 52 of the track member 34 and thus the adhesive tape 14. A blade 49 of the cutting member 48 is operable to selectively extend outwardly from the cutting member 48. The cutting member 48 also includes an engaging arm 47 extending outwardly therefrom and in communication with the blade 49 on one end and an actuator 45, such as a pneumatic cylinder or the like on the end opposite the blade 49. While the cutting member 48 is illustrated with a blade 49 for separating a portion of the adhesive tape 14 from the spool member 18, other means of cutting may be employed, as are known to those skilled in the art.

A portion 54 of the second end 40 of the track member 34 is operable to pivot about a pivot point (not shown). An actuator 58 is disposed adjacent the pivoting portion 54 of the track member 34 and includes an extension member 60 in contact with the pivoting portion 54. The extension member 60 engages with the pivoting portion 54 in a gap 62 formed between a pair of engaging fingers 64, best seen in FIG. 2. The actuator 58 is operable to move the extension member 60 between an extended position and a retracted position in a direction indicated by an arrow 66 and thus move the pivoting portion 54 in a direction indicated by an arrow 68 between a first position substantially parallel to the longitudinal axis 52 of the track member 34 and a second position indicated by a line 70 during operation of the apparatus 10, discussed in more detail below.

Referring now to FIG. 3 a schematic view of the apparatus 10 is shown. A controller 72 is in communication with the motive apparatus 12, the sensor 46, such as through the wire 50, the cutting member 48, and the actuator 58. The controller 72 is preferably a microprocessor or similar computing means operable to receive, send, and process signals. The controller 72 is also preferably in communication with and operable to receive signals from a wheel balancer 74. The wheel balancer 74 may be any type of wheel balancing apparatus capabilities known to those skilled in the art, preferably with the ability to communicate with the controller 72. The signals sent from the wheel balancer 74 preferably correspond to a required amount of weights, such as the number of weight segments 16 or the amount of weight in ounces, needed to balance a tire and wheel assembly (not shown). The controller 72 is also operable to send signals to the motive apparatus 12 to commence and end operation of the motive apparatus 12, to receive signals from the sensor 46, and to send signals to the actuator 58 and the cutting member 48, discussed in more detail below. The respective communication links between the controller 72 and the motive apparatus 12, the sensor 46, the cutting member 48, the actuator 58, and the wheel balancer 74 may be through a wired connection, such as the wire 50 on the sensor 46, or through a wireless connection, such as a through corresponding transmitters and receivers on the controller 72, the sensor 46, the cutting member 48, the actuator 58, and the wheel balancer 74 or through other conventional means for communicating between such components.

In operation, an operator (not shown) places and attaches a tire and wheel assembly (not shown) on a tire balancer, such as the wheel balancer 74 of FIG. 3. The wheel balancer 74, when operated by the operator, provides a signal to a controller, such as the controller 72 of FIG. 3. The signal sent from the wheel balancer 74 to the controller 72 corresponds to a required amount of weights to balance the tire and wheel assembly. The apparatus 10 is in a rest position, with the pivoting portion 54 in the first position parallel to the longitudinal axis 52 of the track member 34. The controller 72 sends a signal to the motive apparatus 12 to engage the free end of the adhesive tape 14 and begin moving the adhesive tape 14 from the first end 38 to the second end 40 of the track member 34. As the adhesive tape 14 passes by the guide frame 44, the sensor 46 detects the weights 16 of the tape 14 as the weights 16 pass thereby. Each time a weight 16 passes by the sensor 46, the sensor 46 provides a signal to the controller 72, which increments a counter, for example (not shown). The free end of the adhesive tape 14 moves beyond the second end 40 of the track member 40. When the counter equals the required amount of weights sent by the wheel balancer 74 to the controller 72, the controller 72 sends respective signals to stop the motive apparatus 12 and actuate the actuator 58.

After receiving the signal from the controller 72, the actuator 58 moves the extension member 60 in the direction 66, and one of the arms 64 engages the pivoting portion 54 and moves the pivoting portion 54 from the first position parallel to the longitudinal axis 52 to the second position 70, as shown in FIG. 1. The tape 14 remaining between the guide frame 44 and the second end 40 of the frame member 34 is also pivoted in the direction 68, which exposes one of the gaps between the weights 16 in the tape 14. When the pivoting portion 54 and the trapped portion of the tape 14 reaches the second position 70, the controller 72 sends a signal to the actuator 45 of the cutting member 48, which moves the engaging arm 47 and the blade 49 of the cutting member 48 towards the gap in the tape. The blade 49 cuts the tape 14 at the predetermined location, allowing the tape downstream of the frame 44 to drop to an operator accessible receiving location (not shown).

After the adhesive tape 14 has been cut, the controller 72 sends a signal to the actuator 58 and the other of the arms 64 of the extension member 60 moves the pivoting portion 54 from the second position 70 to the first position parallel to the longitudinal axis 52. The operator then takes the cut adhesive tape 14 and attaches it to the tire and wheel assembly, preferably by removing the backing strip from the tape 14 and placing the adhesive on a predetermined mounting location (not shown) on the wheel.

Referring now to FIGS. 4 and 5, an alternative embodiment of an apparatus for dispensing a predetermined amount of weighted tape in accordance with the present invention is indicated generally at 10'. The apparatus 10' includes a motive apparatus 12' in communication with and operable to selectively move the supply of weighted adhesive tape 14. The adhesive tape 14 includes the plurality of weights 16 disposed thereon. The supply of adhesive tape 14 is coiled about and is operable to be dispensed from a spool member, such as the spool member 18 of FIG. 1.

The motive apparatus 12' includes a motor 22' and a shuttle member 80. The motor 22' is preferably a reversible electric motor and is connected to an electrical power source (not shown). The motor 22' is preferably connected to the shuttle member 80 by a gear and drive belt assembly (not shown) or similar connection that is operable to move the shuttle member 80 between a first end 82 and a second end 84 of a shuttle track 86 in a direction indicated by an arrow 88. The shuttle member 80 includes a first gripper arm 90 and a second gripper arm 92 extending therefrom. The second gripper arm 92 includes a gripper shoe 93 on a free end thereof. The shuttle track 86 is arranged or oriented substantially parallel to the elongated track member 34 and the first end 82 is disposed adjacent the first end 38 and the second end is disposed adjacent the second end 40. The adhesive tape 14 may be easily slid along the track member 34.

The shuttle member 80 includes an actuator (not shown) that is operable to move the second gripper arm 92 and gripper shoe 93 in a direction indicated by an arrow 94 (i.e., either move the shoe 93 towards or away from the shuttle member 80). The motive apparatus 12' is in communication with a controller, such as the controller 72 of FIG. 3. The apparatus 10' also includes the guide frame 44, the sensor 46 having the wire 50, and the cutting member 48 having the engaging arm 47, the actuator 45, and the blade 49 of the apparatus 10 shown in FIGS. 1 and 2. The apparatus 10' may also include an actuator and a pivoting portion of the track member 34 (not shown), such as the actuator 58 and the pivoting portion 54 of FIGS. 1 and 2. The controller 72 in the apparatus 10' is in communication with the motive apparatus 12', a wheel balancer, such as the wheel balancer 74 of FIG. 3, the cutting member 48 and the sensor 46 and the actuator 58, if applicable, in a manner similar to that shown in FIG. 3.

In operation, an operator (not shown) places and attaches a tire and wheel assembly (not shown) on a tire balancer, such as the wheel balancer 74 of FIG. 3. The wheel balancer 74, when operated by the operator, provides a signal to a controller, such as the controller 72 of FIG. 3. The signal sent from the wheel balancer 74 to the controller 72 corresponds to a required amount of weights to balance the tire and wheel assembly. The controller 72 sends a signal to the motive apparatus 12' to engage the free end of the adhesive tape 14 and begin moving the adhesive tape 14 from the first end 38 to the second end 40 of the track member 34. The motive apparatus 12' moves the tape 14 by first engaging the motor 22' to move the shuttle member 80 in the direction 88 towards the motor 22'. When the shuttle member 80 has reached a point close to the motor 22' or has moved a predetermined distance, the shuttle 80 is stopped and the actuator on the shuttle 80 is activated to move the arm 92 and the shoe 93 towards the shuttle 80, gripping the adhesive tape 14 between the shoe 93 and the track member 34 in the process. The motive apparatus 12' then engages the motor 22' in an opposite direction to move the shuttle 80 away from the motor 22', moving the adhesive tape 14 from the first end 38 to the second end 40 of the track member 34. As the adhesive tape 14 passes by the guide frame 44, the sensor 46 detects the weights 16 of the tape 14 as the weights 16 pass thereby. Preferably, each time a weight 16 passes by the sensor 46, the sensor 46 provides a signal to the controller 72, which increments a counter (not shown). The free end of the adhesive tape 14 moves beyond the second end 40 of the track member 40. When the counter equals the required amount of weights sent by the wheel balancer 74 to the controller 72, the controller 72 sends respective signals to stop the motive apparatus 12' and to the actuator 45 of the cutting member 48, which moves the engaging arm 47 and the blade 49 of the cutting member 48 towards the gap in the tape. The blade 49 cuts the tape 14 at the predetermined location and the tape downstream of the frame 44 drops to a receiving location (not shown). The operator then takes the cut adhesive tape 14 and attaches it to the tire and wheel assembly, preferably by removing the backing strip from the tape 14 and placing the adhesive on a predetermined mounting location (not shown) on the wheel.

If the apparatus 10' includes the pivoting portion 54 and the actuator 58 of the apparatus 10, the controller 72 sends a signal to the actuator 58 to pivot the pivoting portion 54 to aid in cutting the tape 14 and, after the adhesive tape 14 has been cut, the controller 72 sends a signal to the actuator 58 and the other of the arms 64 of the extension member 60 moves the pivoting portion 54 from the second position 70 to the first position parallel to the longitudinal axis 52.

Figure 6:
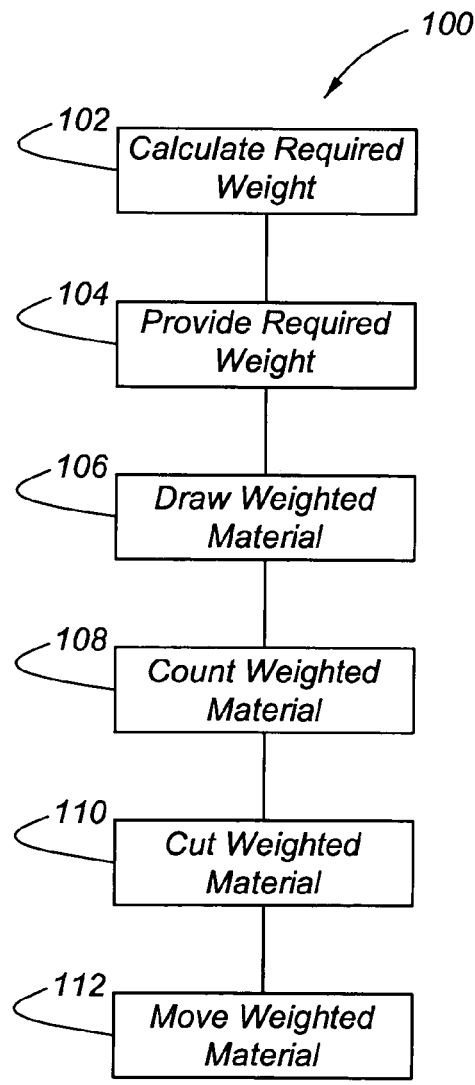
FIG. 6 is a flowchart view of a method of operating the apparatus in accordance with the present invention.

Referring now to FIG. 6, a method for operating the apparatus 10 or 10' in accordance with the present invention is indicated generally at 100. The method 100 begins in a step 102, where a required weight is calculated, such as by placing the tire and wheel assembly on the wheel balancer 74 of FIG. 3. In the step 104, the required weight is provided, such as the signal provided from the wheel balancer 74 to the controller 72 of FIG. 3. In a step 106, the weighted material, such as the adhesive tape 14, is drawn, such as by moving the adhesive tape 14 from the first end 38 to the second end 40 of the track member 34 by either the motive apparatus 12 or the motive apparatus 12'. In a step 108, the weighted material is counted, such as by the sensor 46 providing a signal to the controller 72 as the adhesive tape 14 passes thereby. In a step 110, the weighted material is cut, such as by actuating the cutting member 48 of the apparatus 10 or 10'. In a step 112, the cut weighted material is moved, such as by the operator taking the adhesive tape 14 from the apparatus 10 or 10' and attaching the tape 14 to the tire and wheel assembly as discussed above. Alternatively, a robot arm or the like (not shown) takes the adhesive tape 14 from the apparatus 10 or 10' and attaches the tape 14 to the tire and wheel assembly.

The simplified flowchart shown in FIG. 6 is exemplary of the method 100 of the present invention. Those skilled in the art will appreciate, therefore, that the steps 102, 104, 106, 108, and 110 of the method 100 may be executed in sequences other than those shown in FIG. 6 including, but not limited to, the execution of a subset of the steps 102, 104, 106, 108, and 110 and the simultaneous execution of one or more steps 102, 104, 106, 108, and 110.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An apparatus for dispensing adhesive weighted tape, comprising:
    a controller adapted to receive a request for a desired number of connected segments of adhesive weighted tape, each segment spaced from another segment by a gap;
    at least one elongated track member having a first end and a second end and adapted to receive a supply of the adhesive weighted tape having a free end engageable with said first end of said at least one track member, the track member including a pivoting portion that pivots the track member and said weighted tape between alignment with a first axis and alignment with a second axis;
    a sensor mounted on said at least one track member, said sensor in communication with said controller and operable to transmit a signal to said controller representing a number of tape segments carried to the sensor on said track member;
    a motive apparatus in communication with said controller and adapted to selectively move tape segments from said first end to said second end of said at least one track member;
    a cutting member in communication with said controller and adapted to cut said weighted tape at a gap between weighted tape segments that is exposed when the track and tape are stopped at the cutting member and pivoted between said axes.

2. The apparatus according to claim 1 wherein said motive apparatus is a pair of drive rollers engaging said supply of weighted tape and driven by a motor in communication with said controller.

3. The apparatus according to claim 1 wherein said motive apparatus comprises a shuttle member having at least one gripper arm extending therefrom, said shuttle member driven by a reversible motor in communication with said controller, said gripper portion in communication with said controller.

4. The apparatus according to claim 3 wherein said at least one track member is a pair of track members oriented in parallel, said weighted tape being positioned on one of said track members and a shuttle member being positioned on another of said track members.

5. The apparatus according to claim 1 wherein said cutting member includes a blade and an actuator for extending the blade to cut the weighted tape and to retract the blade after cutting the tape.

6. The apparatus according to claim 1 wherein said cutting member includes an engagement arm for actuating said cutting member.

7. The apparatus according to claim 1 wherein said weighted tape is disposed on a spool member.

8. The apparatus according to claim 1 wherein said sensor is an electronic eye.

9. The apparatus according to claim 1 wherein said track member is at least partially coated with a Teflon material.

10. The apparatus according to claim 1 wherein said track member is formed in a U-shape.

11. The apparatus according to claim 1 including a guide frame positioned adjacent said second end of said track member.

12. The apparatus according to claim 1 wherein said pivoting portion is operable to be moved by an actuator, said actuator in communication with said controller.

13. A method of dispensing weight material for balancing a tire and wheel assembly, comprising the steps of:
    a) determining a desired number of connected segments of adhesive weighted tape to balance the tire and wheel assembly;
    b) communicating said desired number of segments of adhesive weighted tape to a controller;
    c) using a motive apparatus to move connected segments of adhesive weighted tape;
    d) detecting the desired number of segments of adhesive weighted tape moved to a reference position in step c);
    e) stopping the motive apparatus when the desired number of segments of adhesive weighted tape has passed the reference position;
    f) pivoting the adhesive weighted tape to produce a gap at the reference position between the desired number of segments of adhesive weighted tape and other segments of adhesive weighted tape;
    g) cutting the adhesive weighted tape at the gap to separate the desired number of segments of adhesive weighted tape from the other segments of adhesive weighted tape; and
    h) moving the desired number of segments of adhesive weighted tape to a predetermined location.

14. The method according to claim 13 wherein step h) includes applying said cut weights to a predetermined location on a tire and wheel assembly.

15. The method according to claim 13 wherein steps c) and e) are performed by alternately engaging and disengaging a pair of drive rollers attached to a motor.

16. The method according to claim 13
    wherein steps c) and e) are performed by alternately operating and stopping a shuttle member having a pair of gripper arms and driven by a reversible motor.

17. The method according to claim 13 wherein step d) is performed by a sensor.

18. The method according to claim 13 wherein step h) is performed by an operator.

19. The method according to claim 13 wherein step h) is performed by a robot.

* * * * *